March 20, 1934.  A. TROSCH  1,951,586
MACHINE TOOL
Filed Sept. 18, 1929  4 Sheets-Sheet 1

INVENTOR
Alfred Trosch
Harold E. Stonebraker
his ATTORNEY

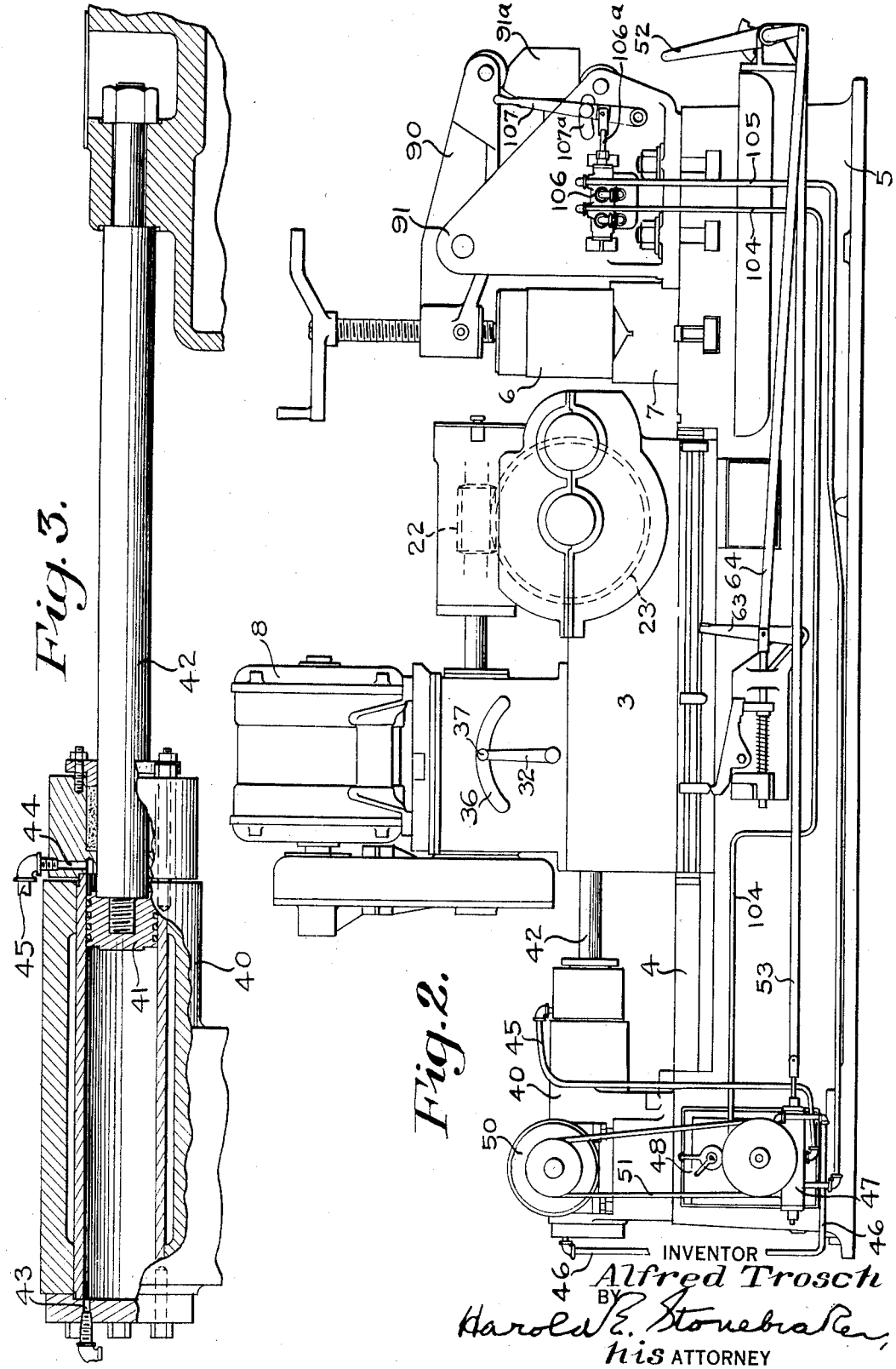

March 20, 1934.   A. TROSCH   1,951,586
MACHINE TOOL
Filed Sept. 18, 1929   4 Sheets-Sheet 3

INVENTOR
Alfred Trosch
BY Harold E. Stonebraker
his ATTORNEY

March 20, 1934.  A. TROSCH  1,951,586
MACHINE TOOL
Filed Sept. 18, 1929   4 Sheets-Sheet 4
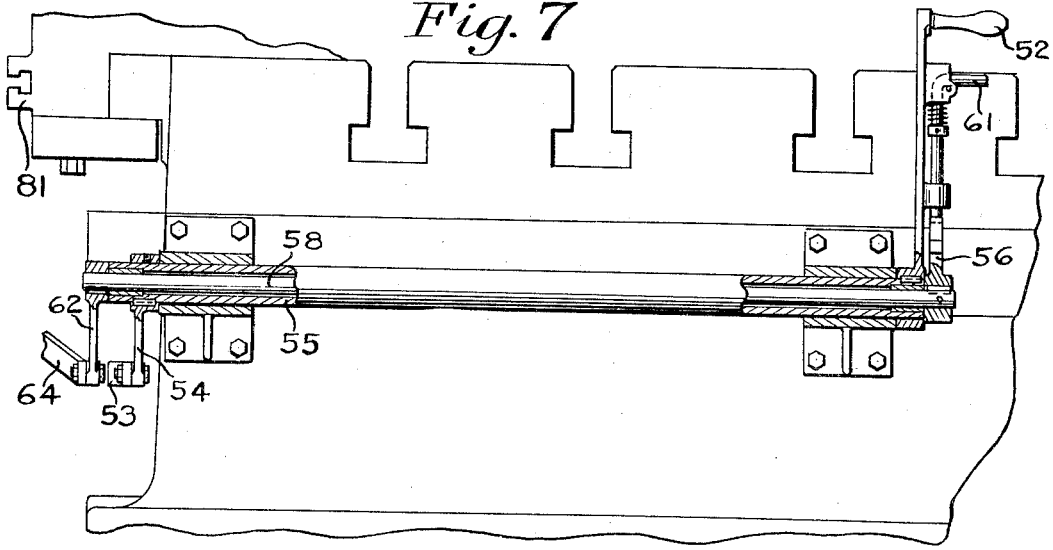
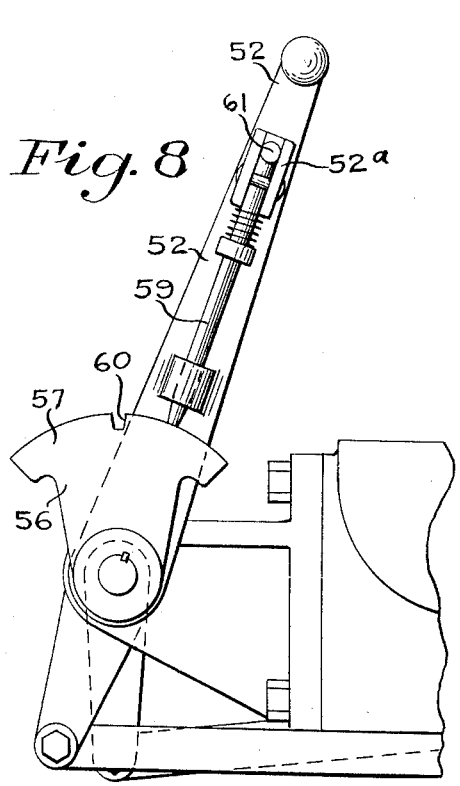
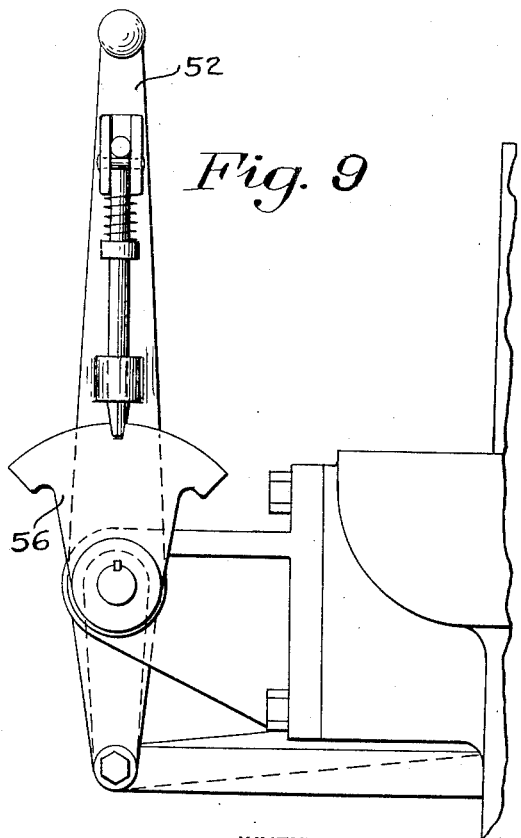
INVENTOR
Alfred Trosch
BY Harold E. Stonebraker
his ATTORNEY Patented Mar. 20, 1934

1,951,586

UNITED STATES PATENT OFFICE 1,951,586

MACHINE TOOL

Alfred Trosch, Rochester, N. Y., assignor to Consolidated Machine Tool Corporation of America, Rochester, N. Y., a corporation of Delaware Application September 18, 1929, Serial No. 393,447

2 Claims. (Cl. 29—69)

This invention relates to improvements in machine tools, especially to that class of machine tools adapted to cut iron bars, girders or the like into lengths.

The object of the invention is to provide a machine tool of this kind which is simple in construction and more efficient in operation than machines of this kind as previously constructed.

Another object of the invention is to construct a machine of this kind in which the carrier for the cutter is moved by hydraulic pressure supplied through a pump and controlled automatically by the movement of the carrier.

A further object of the invention is to provide a machine of this kind in which a tool carrier is moved by fluid pressure supplied by a pump, and flow of the fluid controlled automatically by the movement of the carrier to move the carrier rapidly to move the tool to the work piece, slowly while the tool operates on the work piece, to return the carrier rapidly and stop its movement at the end of its return movement, means being provided for disconnecting the automatic devices to permit manual operation of the carrier.

To these and other ends, the invention consists in the construction and arrangement of parts that will appear from the following description when read in conjunction with the accompanying drawings, the novel features being pointed out in the claims following the specification.

In the drawings:

Figure 2 is a side elevation of the machine;

Figure 3 is a detail view of devices for operating the tool carrier;

Figure 7 is a fragmentary front elevation partly in section showing devices for controlling the movement of the tool carrier;

Figure 8 is a fragmentary enlarged side view of the devices shown in Figure 7, and Figure 9 is a similar view showing the parts in another position.

Similar reference numerals refer to the same parts in all the figures of the drawings.

Figure 1:
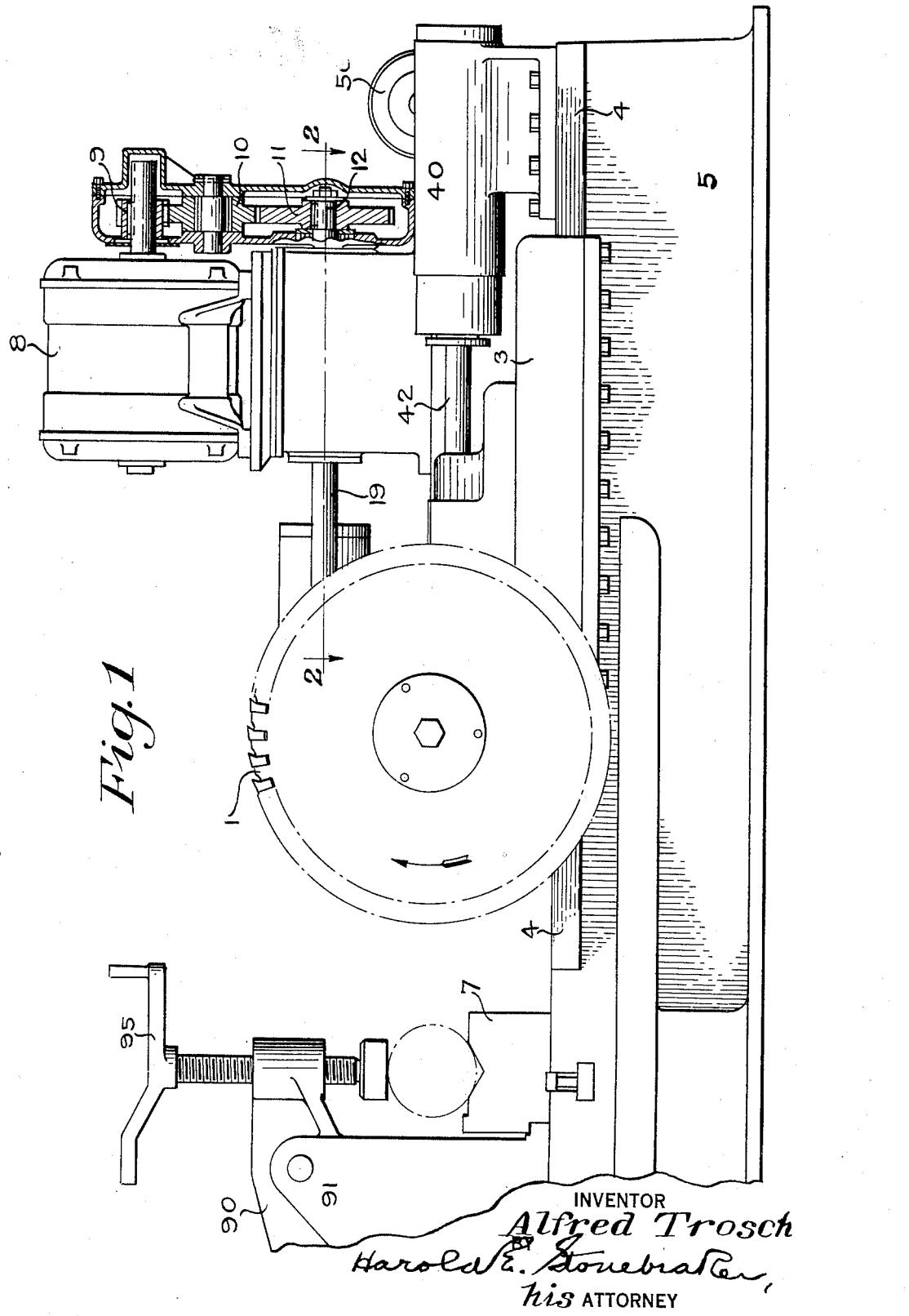
Figure 1 is a side elevation, partly in section, of a machine tool constructed according to one embodiment of the invention.

The preferred embodiment of the invention illustrated in the accompanying drawings comprises a tool carrier movable on a support toward and from a work support to carry a cutting tool to and from operative engagement with a work piece on the work support. The tool or cutter is rotated by power derived from a suitable motor, and means are provided for varying its speed of rotation to adapt the speed to different kinds of work. Hydraulic devices comprising an oil gear pump operating through a cylinder and piston are employed for operating the tool carrier.

Referring to the drawings, 1 is a cutting tool, in the present instance in the form of a cold saw fixed on a spindle revolubly mounted on a carrier 3 which in turn is slidably mounted on a guideway 4 on the base 5 of the machine. The carrier is moved on its guideway to move the tool to and from operative engagement with a work piece 6 clamped in a work support 7 at the forward end of the machine.

The spindle 2 derives its rotary movements from a motor 8 of usual construction, mounted on the tool carrier and having a spur gear 9 on its drive shaft which transmits motion to the spur gear 11 through the gear 10. The gear 11 is keyed to a shaft 12 which transmits motion to a shaft 19 through a series of gears, not shown, and the shaft 19 in turn drives the spindle on which the saw 1 is mounted.

The tool carrier is moved to carry the tool into operative engagement with a work piece in the work holder or to retract it from the work piece after an operation is completed. Hydraulic means are employed for accomplishing these movements, and comprise a cylinder 40 mounted on the base in rear of the carrier, in which is adapted to reciprocate a piston 41 on the end of a piston rod 42 extending rearwardly from the tool carrier.

The cylinder is provided with the ports 43 and 44, one at each end thereof, which are connected by means of the pipes or conductors 45 and 46 with a control valve 47 operatively connected with an oil gear pump 48 of a suitable type and of unitary construction, well known in the art, and adapted to deliver variable hydraulic pressures for rapid traverse, slow feeding or reverse movement. The control valve 47 may be any conventional type of valve used for this purpose, such for instance as the six-way manually operated control valve #C—450 manufactured by Vickers, Inc., of Detroit, Michigan, although the particular construction of valve forms no part of this invention. The oil gear pump is operated by a suitable motor 50 connected with the pulley of the oil gear pump by means of a suitable flexible belt 51. It will be understood that the application of hydraulic pressure to one end or the other of the piston 41 in its cylinder is effective to move the piston in one direction or the other in the cylinder. It will be understood that the oil gear pump is controlled by the valve and is adapted to deliver hydraulic pressure to the cylinder for moving the tool carrier forward rapidly, when moving idly, to engage the tool with the work piece, slowly while operating on the work, and to reverse the pressure and return the carrier rapidly when the operation is complete.

In order to increase the output from the machine, it is desirable to move the tool rapidly while moving idly to and from the work piece and slowly while operating thereon. Means operated automatically by the movement of the carrier have been provided for accomplishing this and also to stop the movement of the carrier when its return stroke is complete.

To this end, the valve 47 is connected with a hand lever 52 conveniently arranged at the front of the machine and, by means of a rod 53 is connected to the valve at one end and having its other end pivoted to an arm 54 secured to one end of a tubular or hollow rock shaft 55 extending transversely at the front of the machine and having the lever 52 mounted on its other end (see Figures 7, 8 and 9). It will be understood from the above that movements of the lever 52 will be transmitted to the valve through the shaft 55 and the rod 53. By moving the hand piece 52 in one direction or the other, the operator can control the deliver of hydraulic pressure from the oil gear pump through the control valve to the cylinder 40, to move the tool carrier rapidly to move the tool into operative engagement with a work piece slowly to operate thereon and to reverse the movement of the carrier to retract the tool to its initial position.

Means are provided for actuating the hand piece 52 automatically by means controlled by the movements of the carrier. Said means comprises an arm 56 having a sector or curved portion 57 and secured to the end of a rock shaft 58 mounted to turn in the hollow rock shaft 55. The sector or curved portion has an opening 60 in its periphery adapted to be engaged by a spring-pressed detent 59 mounted on the hand piece or arm 52. The detent is provided with a finger piece 61 by which the detent may be disengaged from the arm 56 to permit the hand piece 52 to move independently thereof. When released, the detent may slide idly on the sector until it reaches the opening 60 which it engages under the action of its spring.

Any suitable means may be employed for retaining the detent out of engagement with the sector 57. In the illustrated embodiment, the finger piece operates in a guideway 52ª on the arm 52 and normally engages a stop provided therefor in the guideway. By moving the detent until the finger piece is withdrawn from the guideway, it may be turned about its axis to engage the end of the guideway which retains it out of engagement with the sector. By disengaging the detent from the sector, the tool carrier can be disengaged from operation by the automatic devices at any point in its movement in either direction and thereafter operated manually by means of the arm 52.

Figure 4:
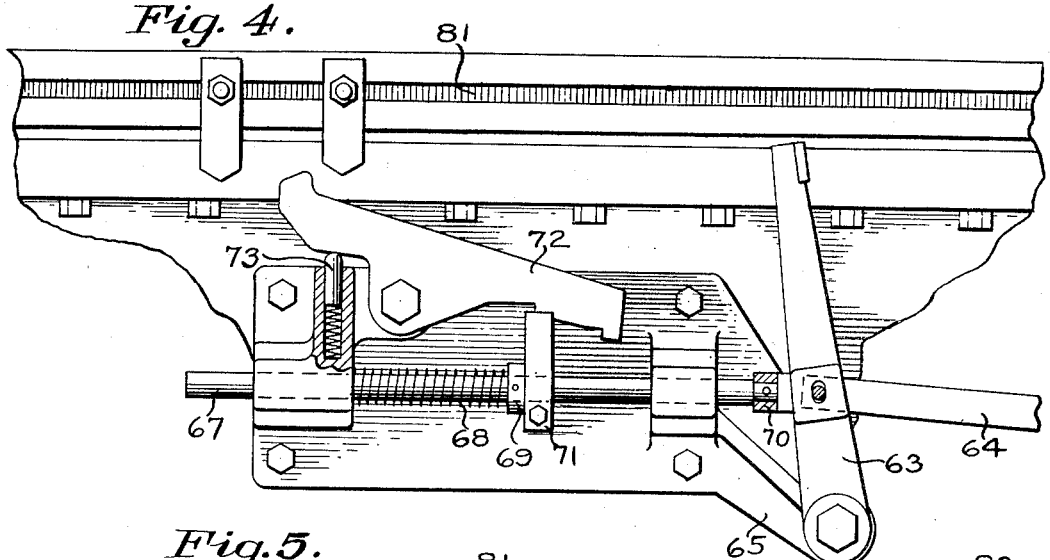
Figures 4, 5 and 6 are detail views illustrating the operation of devices for controlling the movements of the tool carrier.
Figure 5:
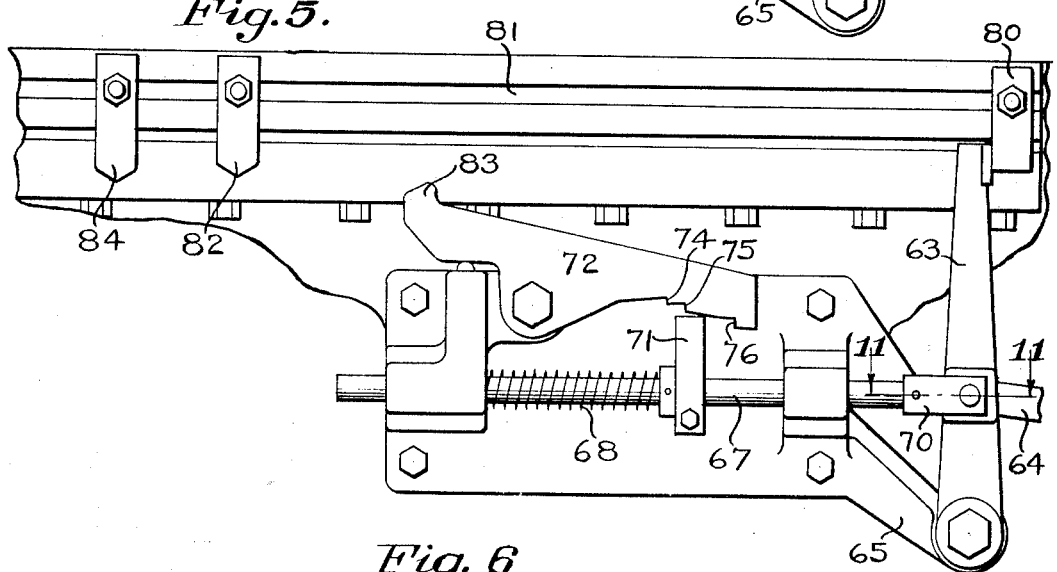
Figure 6:
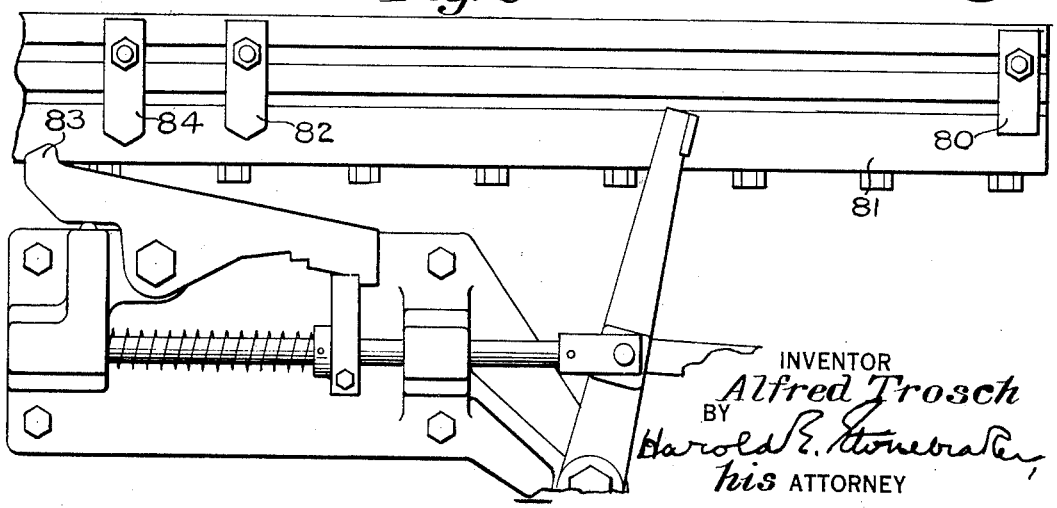

The shaft 58 extends longitudinally through the hollow shaft 55 and at its other end has an arm 62 secured thereto, which is connected with an arm 63 by means of a link 64. The arm 63 is pivoted to a bracket 65 secured to the base of the machine. Also mounted to slide in bearings in the bracket 65 is a follower pivotally connected at one end with the arm 63 (see Figures 4 to 6). Said follower comprises a rod 67 slidable in its bearings, having an expansion spring 68 coiled about the same and engaging at one end a collar 69 adjustably secured to the rod 67 and anchored against the bracket 65 at its other end. It will be noted that movements of the arm 63 are transmitted to the arm 56 through the link 64. In order that the rod 67 may slide readily in its bearings without binding, it is connected to the arm 63 by means of a link 70, having the arm 63 pivoted thereto at one end and pivoted to the rod 67 at its other end.

Also adjustably mounted on the rod 67 is a stop 71 adapted to engage one or another of a plurality of stops or shoulders on a dog 72 pivotally mounted on the bracket 65, and resiliently held with one end in contact with the projection 71 by means of a spring-pressed plunger 73 mounted in the bracket and engaging the other end of the dog. The projection 71 is adapted to engage one or another of three stops 74, 75 or 76 provided on the dog 72 and is resiliently held in engagement therewith by the spring 68.

The operation of the parts is as follows. With the follower as in Figure 5, the carrier is at rest and the oil gear pump and control valve are adjusted to a neutral position. The follower is retained in this position by the engagement of the arm 63 with a projection or depending lug 80 adjustably mounted in a T-slot 81 on the side of the tool carrier, and the dog 72 engages the projection 71 at a point between the stops 75 and 76. Movement of the hand piece 52 forwardly or to the right in Figure 2 moves the follower to the left until the projection 71 engages the stop 74 on the dog 72 and also the rod 53 to adjust the control valve and oil gear pump to move the carrier rapidly toward the work holder. When the tool approaches the work piece, a second projection or depending lug 82 also adjustably mounted in the slot 81 engages a projection or lug 83 on the rear end of the dog 72 and depresses it against the plunger 73 to raise its forward end until the shoulder 74 disengages the follower which then moves forwardly under the action of its spring until it engages the stop 75 on the dog. This movement is transmitted through the link 64, hand piece 52 and the rod 53 to adjust the control valve and oil gear pump to move the carrier slowly as it feeds the tool to operate on the work piece.

When the operation is complete, a third projection or depending lug 84 also adjustably mounted in the slot 81 engages the projection 83 on the dog 72 and moves the dog to disengage its stop 75 from the follower which again moves forwardly under the action of its spring until it engages the stop 76 on the dog. This movement is again transmitted to the control valve and oil gear pump to adjust them to impart rapid return movement to the carrier, when the projection 80 again engages the arm 63 and moves the follower to adjust the control valve to a neutral position to stop the carrier.

It will be noted that as the follower 71 successively engages the stops 74, 75 and 76, the plunger 73 is depressed step by step since the stops project progressively greater distances and consequently the projection 83 is retained in the positions to which it is successively moved by the projections 82 and 84. It will also be noted that the projections 82 and 84 have their ends beveled to provide for a camming action when they engage the dog, the projection 82 which first engages the dog being slightly shorter than the projection 84 so that it cannot move the dog so far that the stop 75 fails to engage the projection 71 on the follower. During the return movement of the carrier, the stop 76 of the dog engages the follower to which position the dog has been moved by the longer projection 84 and the lug 83 is consequently out of the path of the projections 82 and 84.

I claim:

1. In a machine tool, the combination of a tool carrier, means for moving the tool carrier, means for controlling said moving means for moving the carriage rapidly to the work support, slowly while operating on the work piece and rapidly from the work support when an operation on the work piece is complete, a follower operatively connected with said controlling means and located intermediate its extreme positions when the machine is at rest, a pivoted dog, a plurality of stops on the dog, means for resiliently engaging the follower with one or another of said stops, means on the carrier for successively swinging the dog to disengage it from the follower, a device connected to the follower, and means on the carrier for moving said device to actuate the follower to said intermediate position.

2. In a machine tool, the combination of a tool carrier, means for moving the tool carrier, means for controlling said moving means for moving the carrier rapidly to the work support, slowly while operating on the work piece and rapidly from the work support when an operation on the work piece is complete, a follower operatively connected with said controlling means and located intermediate its extreme positions when the machine is at rest, resilient means for moving the follower in one direction, a dog, a plurality of stops on said dog arranged to successively engage and retain the follower against the action of said resilient means, means on the carrier for successively operating the dog to successively engage its stops with the follower, an arm pivoted on a support and connected to the follower, and means on the carrier for moving said arm to actuate the follower to said intermediate position and stop the carrier moving means.

ALFRED TROSCH.